United States Patent [19]

Kajiwara

[11] Patent Number: 4,658,599
[45] Date of Patent: Apr. 21, 1987

[54] COOLER FOR AUTOMOTIVE USE
[75] Inventor: Yasuya Kajiwara, Hyogo, Japan
[73] Assignee: Mitsubishi Denki Kabushiki Kaisha, Tokyo, Japan
[21] Appl. No.: 808,688
[22] Filed: Dec. 17, 1985

Related U.S. Application Data

[63] Continuation of Ser. No. 738,207, May 28, 1985, abandoned.

[30] Foreign Application Priority Data

May 28, 1984 [JP] Japan .............................. 59-109856
May 31, 1984 [JP] Japan .............................. 59-113458

[51] Int. Cl.⁴ ............................................. B60H 1/32
[52] U.S. Cl. ...................... 62/239; 62/235.1; 62/244
[58] Field of Search .................. 62/239, 244, 235.1, 62/119

[56] References Cited

U.S. PATENT DOCUMENTS

| | | | |
|---|---|---|---|
| 2,499,736 | 3/1950 | Afkleen | 62/119 X |
| 2,989,854 | 6/1961 | Gould | 62/244 X |
| 3,585,812 | 6/1971 | Parker | 62/244 X |
| 3,680,467 | 8/1972 | Brock | 62/244 X |
| 4,038,835 | 8/1977 | Arnieri | 62/244 |
| 4,307,575 | 12/1981 | Frosch | 62/239 X |
| 4,342,203 | 8/1982 | Moore | 62/244 |
| 4,497,240 | 2/1985 | Nagatomo et al. | 62/235.1 X |

OTHER PUBLICATIONS

A. Basuilis et al, "Emerging Heat Pipe Applications," Third International Heat Pipe Conference, May 1978, K. Itoh, Heat Pipe Research and Development in Japan.

Primary Examiner—Lloyd L. King
Attorney, Agent, or Firm—Sughrue, Mion, Zinn, Macpeak & Seas

[57] ABSTRACT

A cooler for automotive use which uses neither the power of the engine nor that of the battery, but instead operates from power supplied by solar cells mounted on the roof of the vehicle. The cooler includes a liquid coolant filled evaporator, a radiator, a heat pipe connecting the evaporator and the radiator, a valve provided in series with the heat pipe for regulating the flow of coolant vapor through the heat pipe, the solar cells, a return pipe through which coolant liquefied in the heat sink is returned to the evaporator, a coolant circulating pump provided in the return pipe and operated by power generated by the solar cells, and fans provided near the evaporator and the radiator which are also operated by power generated by the solar cells. Preferably, the liquid coolant is one having a high saturated vapor pressure, boils at a temperature of about 40° to 70° C. at atmospheric pressure, and provides a large latent heat of evaporation.

8 Claims, 4 Drawing Figures

TO SOLAR CELLS

COOLER FOR AUTOMOTIVE USE

This is a continuation of application Ser. No. 738,207, filed 5/28/85, now abandoned.

BACKGROUND OF THE INVENTION

The present invention relates to a cooler for automotive use, more particularly, to an automotive cooler using a combination of a heat pipe and solar cells.

The operating principles of a conventional cooler for automotive use are as follows: A coolant-filled compressor is operated by the driving force of the rotary shaft of an engine transmitted to the compressor by a suitable means such as a belt. The compressed coolant is supplied to an evaporator section which is cooled by the latent heat of evaporation of the coolant. The air in the passenger compartment is circulated through the evaporator section with a fan so as to force cold air back into the compartment.

By directly using the power of the engine, the conventional cooler system has a high cooling capability but, on the other hand, it does not function at all unless the engine is in operation. The passenger compartment of a parked car on a midsummer day may become so hot as to make the occupants feel very uncomfortable.

One approach that has been proposed for avoiding this problem is to use a timer that automatically starts the engine just before the driver sits behind the wheel, thereby operating the cooler. However, this method has not been brought into commercial use for safety reasons.

A proposal has been made for making use of the strong sunshine on a midsummer day by generating power with a solar cell. However, commercial solar cells with an efficiency of 10% yield a power output of only 100 W/m$^2$, even on a very hot day. This means that even if the roof of a passenger car were entirely covered with solar cells, the electricity output obtained is no more than 100 W, which is far short of the power requirement for operating a compressor. The car's battery could be used as an auxiliary power source, but this method is not advisable since the battery will be readily discharged, possibly rendering subsequent starting impossible. Another approach is to reduce the temperature elevation in the passenger compartment by a fan operated by solar cells. This method, however, has not proved very effective.

SUMMARY OF THE INVENTION

A primary object, therefore, of the present invention is to provide an effective automatic apparatus for cooling the passenger compartment of a parked car on a very hot summer day.

This object of the invention is achieved by a cooler system having a heat pipe that is installed in a car and which has a coolant circulated by means of a pump operated by the power output of a solar cell.

DESCRIPTION OF THE PREFERRED EMBODIMENTS

The cooler for automotive use in accordance with the present invention will hereunder be described with reference to the embodiment illustrated in the accompanying drawings.

Figure 1:
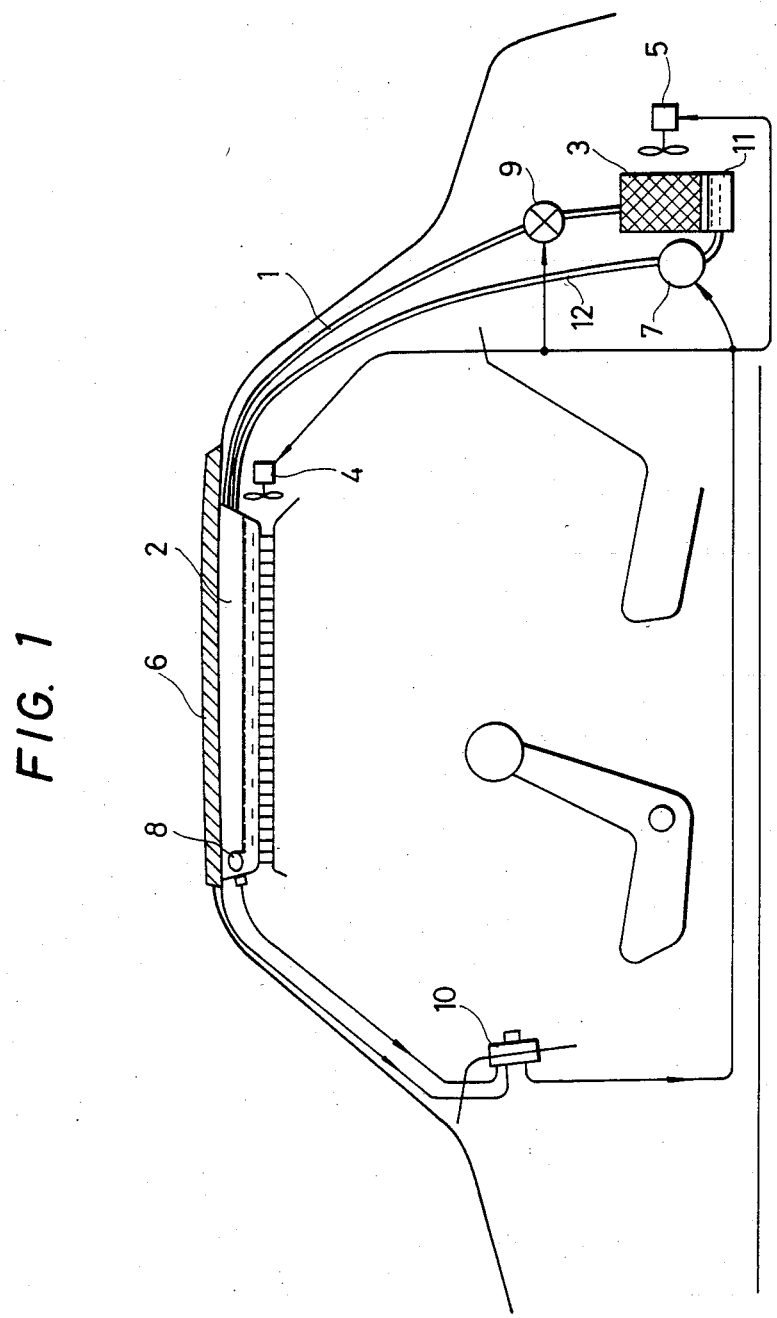
FIG. 1 is a schematic view of an automotive cooling system in accordance with a first preferred embodiment of the present invention.

The cooler shown in FIG. 1 includes a liquid coolant filled evaporator 2 installed on the ceiling or other area of the passenger compartment which is heated faster than other parts. This evaporator 2 is connected to one end of a heat pipe 1, the other end of which is connected to a radiator 3 installed in a relatively cool area of the car, for example, the trunk. The radiator or heat sink 3 has a network structure of pipes or the like that facilitates heat dissipation from the coolant delivered to the radiator 3. The evaporator is ribbed at the bottom so as to provide a greater area of contact with air to ensure maximum heat exchange efficiency.

The liquid coolant in the evaporator 2 may be water, but preferred coolants are those which have high saturated vapor pressures, boil at about 40° to 70° C. at atmospheric pressure, and provide a large latent heat of evaporation. It is particularly preferred that such coolants be noncorrosive. Examples of coolants that satisfy these requirements are organic solvents such as alcohols and ketones. The evaporator 2 and radiator or heat sink 3 are equipped with respective fans 4 and 5 so as to enhance their heat exchanging capabilities.

Heat pipes are usually positioned so that the side to be heated or the side which generates heat faces downwardly. The heat carrying vapor is cooled in a radiator or heat sink above the heat pipe, and the resulting liquid drops by force of gravity to return to the heat pipe.

In accordance with the present invention, coolant circulation is effected by operation of a pump 7 operated on power generated by solar cells 6 located on the roof or hood of the car. As shown, the pump 7 is connected in a return pipe 12 connecting a collector 11 and the evaporator 2 and is positioned closer to the collector 11. The coolant liquefied in the radiator drops into the collector 11 and is then forced upwardly to the evaporator 2 by the pump. This pump may be positioned near the evaporator 2 so that the liquefied coolant is drawn by the negative pressure of the vapor.

A liquid level sensor 8 such as a float is provided in the evaporator, and the pump 7 is operated so that the amount of coolant in the evaporator is maintained constant. The heat pipe 1 is equipped with a valve 9 that is capable of blocking the path of the vapor between the evaporator 2 and the radiator 3. This valve may be a manually operated cock, but is preferably a solenoid valve which can be electrically remote controlled so that the cooling cycle is interrupted when the solar cells are switched off to cease the operation of the pump 7 and the fans 4 and 5. The power switch for the solar cells may be operatively associated with an air conditioner switch 10 provided on the dashboard of the car. The cooler in accordance with the present invention may be incorporated in an automotive air conditioner system wherein the cooler is off in the heating mode, and if cooling of the passenger compartment is required, the cooler is operated in combination with the conventional cooling system, thereby reducing the consumption of energy by the air conditioner.

The automotive cooler described above is operated in the following manner. When hot air in the passenger compartment is supplied into the evaporator 2 through the fan 4, the liquid coolant in the evaporator receives the heat of the air and is evaporated. Due to the latent heat of evaporation, the air in the compartment becomes cool. The vapor of the coolant flows through the heat pipe 1 to the radiator 3 where the vapor releases heat and returns to liquid. The radiator 3 is fed with air through the fans 5 so as to increase the efficiency of heat dissipation. Upon liquefaction of the coolant vapor, the vapor pressure in the radiator becomes lower than that in the evaporator and further evaporation of the coolant in the evaporator is promoted by the faster movement of the vapor into the radiator.

If this cycle is continued, all of the liquid coolant in the evaporator will be evaporated and will move to the collector 11 below the radiator until the cooling capability of the system is completely exhausted. Therefore, in accordance with the present invention, the pump 7 provided in the return pipe 12 connecting the collector 11 and the evaporator 2 is operated by the power generated by the solar cell 6. By forcing the liquefied coolant upwardly from the collector 11 into the evaporator, the coolant is circulated through the system to ensure continued cooling of the passenger compartment.

The cooling circuit described above will function even if no cooling of the passenger compartment is desired. If it functions in the heating mode of the heating and cooling system, effective heating may not be achievable. Therefore, in accordance with the present invention, in the heating mode the valve 9 on the heat pipe 1 is closed to block the passage of the vapor from the evaporator 2 to the radiator 3. When this valve is closed, the vapor pressure in the evaporator is increased and further evaporation of the liquid coolant is suppressed to block unnecessary cooling.

The effectiveness of the cooling system in accordance with the present invention may be further enhanced by operatively associating the valve 9 and fans 4 and 5 with the air conditioner switch on the dashboard of the car.

One advantage of using liquid coolants having low boiling points and a large latent heat of evaporation is that only a smaller amount of the liquid need to be pumped, and hence the cooler allows for the use of a small capacity pump which can be satisfactorily operated on the small available power output from the solar cells. The output of the solar cells is also sufficient for driving the fans 4 and 5, as well as valve 9.

Figure 2:
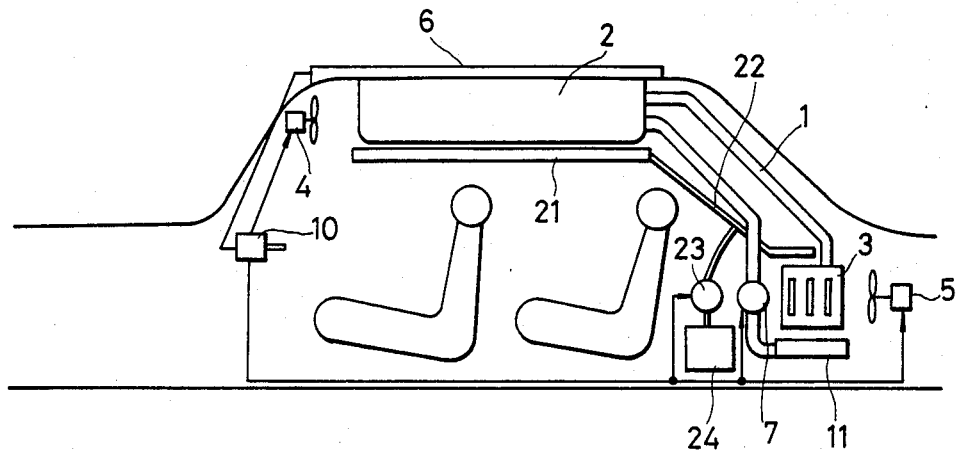
FIG. 2 is a view similar to FIG. 1 showing a second preferred embodiment of an automotive cooling system of the invention.

A second preferred embodiment of the invention is shown in the schematic view of FIG. 2. In FIG. 2, reference numerals used commonly in FIG. 1 identify like components, and hence a further detailed description thereof will be omitted.

The embodiment of FIG. 2 differs from that of FIG. 1 by the addition of a drain tray 21 and associated components. The tray 21, which is positioned below the evaporator 2, collects water which has condensed on the evaporator 2 and dripped therefrom. The outlet of the tray 21 is communicated with a collecting water tank 24. Water collected in the tank 24 is fed via a drain pipe 22 and a pump 23 to a nozzle which sprays the water onto the radiator 3. The pump 23 is of course powered by the solar cells. This has the effect of enhancing the cooling rate of the radiator and improving the efficiency of the cooler. In this embodiment, the fan 4 is located on the forward side of the evaporator 2.

Figure 3:
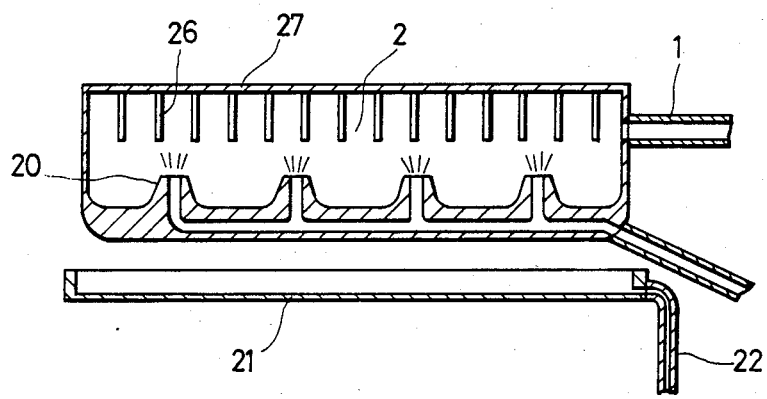
FIG. 3 is a cross-sectional view of an evaporator and related components used in the embodiment of FIG. 2.
Figure 4:
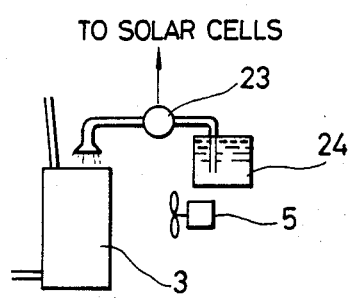
FIG. 4 is a schematic view showing details of a portion of the automotive cooling system shown in FIG. 2.

The cross-sectional view of FIG. 3 shows the evaporator 2 and the tray 21 in more detail. Inside the evaporator 2, nozzles 20 spray the coolant supplied from the pump 7 in mist form against baffle plates 26, the latter extending downwardly from an upper plate 2.

As will be apparent form the foregoing description, with the cooling system of the present invention, hot air in the passenger compartment of a parked car on a midsummer day is constantly discharged to the outside of the car through the heat exchanging action of the coolant without running the engine or using the car's battery. As a result, elevation of the temperature inside the car can be prevented in a very economical and safe manner and the occupants will feel quite comfortable when they re-enter the vehicle.

I claim:

1. A compressorless cooler for cooling a parked automotive vehicle comprising: a liquid coolant filled evaporator provided on a ceiling of a passenger compartment of said vehicle, a radiator provided in a location in said vehicle which is not exposed to direct rays of the sun and which is ventilated, a heat pipe connecting said evaporator and said radiator, a valve provided in series with said heat pipe for regulating the flow of coolant vapor through said heat pipe, solar cells, a return pipe through which coolant liquefied in said heat sink is returned to said evaporator, a noncompressing pump for circulating said liquid coolant, said pump being provided in said return pipe and being operated by power generated by said solar cells, and fans provided in the vicinity of said evaporator and said radiator and which are also operated on power generated by said solar cells.

2. The cooler for automotive use of claim 1, wherein said liquid coolant has a high saturated vapor pressure, boils in a temperature range of about 40° to 70° C. at atmospheric pressure, and has a large latent heat of evaporation.

3. The cooler for automotive use of claim 2, wherein said coolant is an organic solvent.

4. The cooler for automotive use of claim 3, wherein said organic solvent is selected from the group consisting of alcohols and ketones.

5. The cooler for automotive use of claim 1, wherein said valve, said pump, and one of said fans is provided in a trunk of the vehicle.

6. The cooler for automotive use of claim 5, wherein said radiator is provided on a ceiling of a passenger compartment of said vehicle.

7. The cooler for automotive use of claim 1, further comprising a drip collecting tray positioned under said evaporator, a water collecting tank, a pipe communicating said tray with said tank, and a second pump for pumping water from said tank onto said radiator for cooling said radiator.

8. The cooler for automotive use of claim 7, wherein said second pump is powered by said solar cells.

* * * * *